US012654864B2

(12) United States Patent
Christie et al.

(10) Patent No.: US 12,654,864 B2
(45) Date of Patent: Jun. 16, 2026

(54) COMPONENT FOR AIRCRAFT INTERIORS

(71) Applicant: B/E Aerospace (UK) Limited, Leighton Buzzard (GB)

(72) Inventors: Damian Christie, Belfast (GB); Paolo Ballocchi, Newcastle (GB)

(73) Assignee: B/E Aerospace (UK) Limited, Leighton Buzzard (GB)

( * ) Notice: Subject to any disclaimer, the term of this patent is extended or adjusted under 35 U.S.C. 154(b) by 142 days.

(21) Appl. No.: 18/602,607

(22) Filed: Mar. 12, 2024

(65) Prior Publication Data

US 2024/0336363 A1      Oct. 10, 2024

(30) Foreign Application Priority Data

Apr. 6, 2023     (EP) ..................................... 23275060

(51) Int. Cl.
B64D 11/06          (2006.01)
(52) U.S. Cl.
CPC ...... B64D 11/0696 (2013.01); B64D 11/0648 (2014.12); B64D 11/0649 (2014.12)
(58) Field of Classification Search
CPC ............ B64D 11/0696; B64D 11/0648; B64D 11/0649
See application file for complete search history.

(56) References Cited

U.S. PATENT DOCUMENTS

| | | | |
|---|---|---|---|
| 6,324,940 | B1 | 12/2001 | Pazdirek et al. |
| 9,493,192 | B2 | 11/2016 | Baudard et al. |
| 10,112,720 | B2 | 10/2018 | Maslakow |
| 10,124,899 | B2 | 11/2018 | Mansouri et al. |
| 10,603,872 | B2 | 3/2020 | Gruhn et al. |
| 10,766,174 | B2 | 9/2020 | Maslakow |
| 11,008,107 | B2 | 5/2021 | Smith et al. |
| 11,413,996 | B2 | 8/2022 | Morille et al. |
| 2010/0003534 | A1 | 1/2010 | Luetzeler et al. |
| 2020/0207169 | A1 | 7/2020 | Jo |
| 2020/0317349 | A1 | 10/2020 | Achilles et al. |
| 2021/0252753 | A1 | 8/2021 | O'Brien et al. |
| 2023/0174239 | A1 | 6/2023 | Ballocchi et al. |

FOREIGN PATENT DOCUMENTS

| | | |
|---|---|---|
| CN | 104802995 B | 7/2015 |
| EP | 3732102 A1 | 11/2020 |
| JP | 5585069 B2 | 9/2014 |

OTHER PUBLICATIONS

European Search Report dated Sep. 6, 2023; European Application No. 23275060.4.

*Primary Examiner* — Rodney A Bonnette
(74) *Attorney, Agent, or Firm* — Suiter Swantz IP

(57)          ABSTRACT

A component for a structure of an aircraft interior, wherein at least a portion of the component extends between a first point and a second point, defining a longitudinal axis of the component. The component includes at least one bushing. The at least one bushing is located at the first point and/or the second point. The component further includes a fibrous material that extends between the first point and the second point. The component further includes a thermoplastic that at least partially encases the at least one bushing and the fibrous material.

8 Claims, 8 Drawing Sheets

<u>200</u>

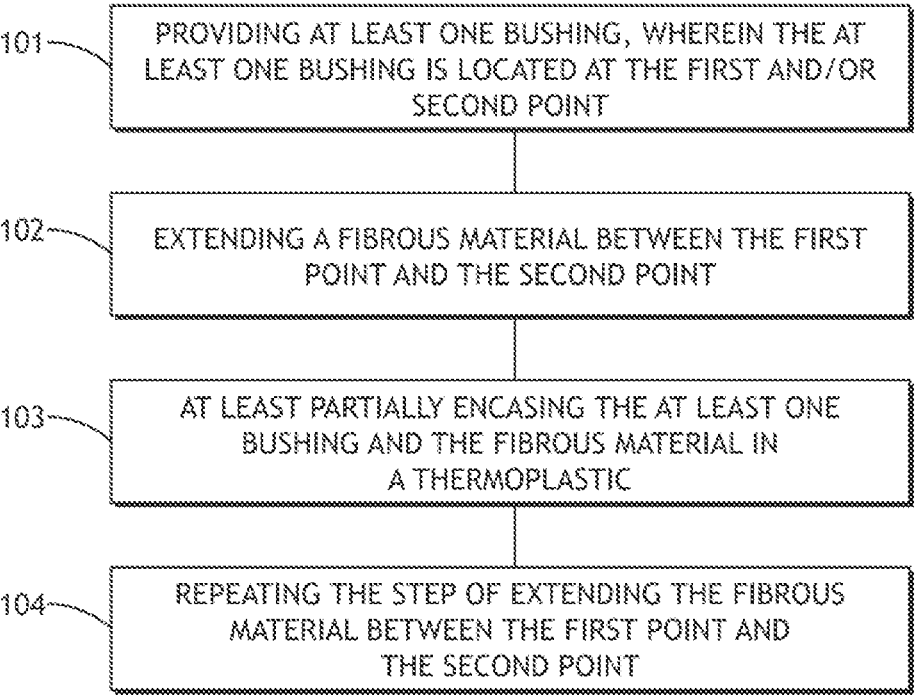

101 — PROVIDING AT LEAST ONE BUSHING, WHEREIN THE AT LEAST ONE BUSHING IS LOCATED AT THE FIRST AND/OR SECOND POINT

102 — EXTENDING A FIBROUS MATERIAL BETWEEN THE FIRST POINT AND THE SECOND POINT

103 — AT LEAST PARTIALLY ENCASING THE AT LEAST ONE BUSHING AND THE FIBROUS MATERIAL IN A THERMOPLASTIC

104 — REPEATING THE STEP OF EXTENDING THE FIBROUS MATERIAL BETWEEN THE FIRST POINT AND THE SECOND POINT

FIG.8

COMPONENT FOR AIRCRAFT INTERIORS

CROSS-REFERENCE TO RELATED APPLICATION

The present application claims the benefit of EP23275060.4, filed Apr. 6, 2023, titled "COMPONENT FOR AIRCRAFT INTERIORS", with a digital access service (DAS) code of F8E2, which is incorporated herein by reference in the entirety.

TECHNICAL FIELD

This disclosure relates to a composite part for an aircraft interior. In particular, the disclosure relates to a composite part including at least one bushing, a fibrous material and a thermoplastic.

BACKGROUND

During some flights, aircraft may experience high g-forces and/or large amounts of vibration. Parts for aircraft interiors must be able to withstand these high forces so that their structural integrity is not compromised during a flight. Furthermore, parts for aircraft interiors are used many times. The parts for aircraft interiors must therefore be able to withstand high forces being applied repeatedly.

In some examples, components for aircraft interiors may be formed primarily of metal. Many metals have a high strength, such that metal components are able to withstand high forces when applied to them. However, many metals are dense, leading to components having a large mass. This is undesirable in many aircraft, because it increases fuel consumption and thereby the cost of operating the aircraft.

In some examples, components for aircraft interiors may be formed of thermoplastics. Many thermoplastics are lightweight, resulting in components having a reduced mass compared to those made from metal. However, many thermoplastics are weaker than metals. Furthermore, they may be prone to deformation over time (e.g. elongation and/or creep), due at least in part to the high forces that a component may experience. Deformation of a component can affect its performance, possibly reducing the lifetime of the component.

It is desired to produce a component for an aircraft interior that is strong, lightweight, and resistant to deformation.

SUMMARY

According to an example of the present disclosure, there is provided a component for a structure of an aircraft interior, wherein at least a portion of the component extends between a first point and a second point, defining a longitudinal axis of the component; and wherein the component comprises: at least one bushing, wherein the at least one bushing is located at the first point and/or the second point; a fibrous material that extends between the first point and the second point; and a thermoplastic that at least partially encases the at least one bushing and the fibrous material.

In some examples, the component may form part of a larger structure. In some examples, part of the structure may comprise component(s) in addition to a component in accordance with an example of the present disclosure. In some examples, the entire structure may be a component in accordance with an example of the present disclosure, e.g. the component itself may form the structure.

In some examples, the line connecting the center of the first point with the center of the second point may be defined as the longitudinal axis of the component. In some examples, the apparatus may extend beyond the first point and/or the second point along the longitudinal axis.

In some examples, the component may comprise an aperture (e.g. without a bushing) at the first point or the second point.

In some examples, the at least one bushing may be used to connect the component to part of a structure of an aircraft. In some examples, a fixture (e.g. a bolt or pin) that is attached to a structure of an aircraft may extend through (e.g. each of the) at least one bushing to connect the component to the structure.

In some examples, the component may remain stationary relative to the structure of an aircraft (e.g. be held stationary relative to the structure of an aircraft). In some examples, the component may be able to move relative to the structure of an aircraft. For example, the component may be able to rotate about (e.g. each of) the at least one bushing and/or be able to move along the longitudinal axis of the fixture.

The at least one bushing may be any suitable and desired type. In examples, where a bushing is located at the first point and a bushing is located at the second point, the two bushings may be substantially identical (e.g. of a similar shape, size and/or material). In other examples, the two bushings may not be identical (e.g. each having a different shape, size and/or being formed of a different material).

In some examples, the component may include more than two bushings. In some examples, the number of bushings may be chosen based on the number of connections that are required to other parts of the structure of an aircraft.

The fibrous material may be any suitable and desired type. In some examples, the fibrous material may consist entirely of fibers. In some examples, the fibrous material comprises (e.g. carbon) fibers and at least one other material (e.g. resin or adhesive). For example, the fibrous material may comprise pre-preg fibers.

The fibrous material may extend between the first point and the second point in any suitable and desired way, i.e. between the bushing at the first and/or the second point and the other of the first and second points. In examples where a bushing is located at the first point and a bushing is located at the second point, the fibrous material may extend at least from an outer perimeter of the first bushing to an outer perimeter of the second bushing.

In some examples, the fibrous material may extend in substantially the same direction as the direction of maximum stress and/or load that is applied to the component. In some examples, this may help the fibrous material to provide reinforcement to the component in the direction of maximum stress and/or load.

Any suitable and desired thermoplastic may be used. In some examples, the thermoplastic comprises polyaryl ether ketone (PAEK), e.g. polyether ether ketone (PEEK). Thermoplastic may be advantageously used in a component for a structure of an aircraft interior owing to its low density (e.g. compared to metal), its ability to be molded into any suitable and desired shape, and its mechanical resistance.

In some examples, the component is elongated along its longitudinal axis. In some examples, the longitudinal axis extends from the (e.g. center of the aperture of the) first bushing to the (e.g. center of the aperture of the) second bushing. The component may have a greater dimension in the direction along its longitudinal axis than other dimensions, e.g. in directions perpendicular to the longitudinal axis.

In some examples, (e.g. a front face and/or back face of) the component has a stadium shape (e.g. in a plane containing the longitudinal axis and, e.g., perpendicular to a direction extending through (e.g. each) of the at least one bushing), e.g. having a central rectangular portion with a rounded (e.g. semicircle) portion extending from the shorter sides of the rectangle at each axial end.

In some examples, the at least one bushing is formed of a different material to the thermoplastic. The at least one bushing may be formed of any suitable and desired material. In some examples, it may be desirable for the at least one bushing to have different material properties to the thermoplastic. For example, the at least one bushing may be used to connect the component to another structure of the aircraft interior. The at least one bushing may be required to withstand particularly high stress, as load may be transferred between the component and another structure of the aircraft interior through the at least one bushing.

In some examples, the at least one bushing has a higher stiffness than a stiffness of the thermoplastic. The at least one bushing may be formed of any suitable and desired material which has higher stiffness than the thermoplastic. This may help to reduce creep and/or deformation of the component over time (e.g. compared to using thermoplastic). This may help to increase the lifetime of the component.

In some examples, the at least one bushing is formed (e.g. consist) of metal. In some examples, the metal is stronger than the thermoplastic of the component. In some examples, this allows the volume of the bushing to be reduced, while still producing a bushing of higher strength than the thermoplastic of the component. Therefore, although the metal may have higher density than the thermoplastic of the component, the bushing may be lighter when formed of metal compared to a bushing made using the thermoplastic of the component.

In some examples, the at least one bushing is formed of aluminum (e.g. an aluminum alloy). In some examples, the at least one bushing may be formed of AL6061.

In some examples, the at least one bushing is formed of thermoplastic. In some examples, the thermoplastic of the at least one bushing is different to the thermoplastic used in the rest of the component (i.e. the thermoplastic at least partially encasing the at least one bushing and the fibrous material). In some examples, the thermoplastic of the at least one bushing is stronger and/or stiffer than the rest of the thermoplastic, such that it is more resistant to stress and strain.

In some examples, the first point and the second point are located proximal to axially opposite ends of the component (e.g. wherein the ends are separated in a direction that is substantially parallel to the longitudinal axis of the component). The distance between the first point and the second point may be more than 50% of the length of the component along its longitudinal axis, optionally more than 60%, optionally more than 70%, optionally more than 80%, optionally more than 90%.

In some examples, the at least one bushing comprises an aperture, wherein the at least one aperture extends in a direction substantially perpendicular to the longitudinal axis of the component. In some examples, the (each) aperture has a central axis, and the central axis of the aperture extends in a direction substantially perpendicular to the longitudinal axis of the component. In some examples where a bushing is located at the first point and a bushing is located at the second point, the central axes of the apertures of the two bushings substantially parallel to each other.

The apertures may have any suitable and desired (e.g. cross-sectional) shape. In some examples, the (each) aperture is substantially cylindrical (has a circular cross-section), and the central axis of the (each) cylindrical aperture extends in a direction substantially perpendicular to the longitudinal axis of the component. In some examples, the cross-section of the aperture is square, rectangular, triangular, hexagonal, or cross-shaped.

In some examples, the (each) (e.g. central axis of the) aperture extends in a direction that is substantially perpendicular to a face of the component (e.g. the front and/or back face of the component). In some examples, the (each) (e.g. central axis of the) aperture extends in a direction that is substantially perpendicular to a face of the bushing (e.g. the front and/or back face of the bushing).

In some examples, the (each) aperture is configured to receive a fixture (e.g. a bolt or pin). The fixture may be configured to connect the component to a structure of the aircraft interior.

In some examples, the at least one bushing comprises at least one groove, wherein a portion of the fibrous material is situated inside the at least one groove.

In some examples, the at least one groove is used during manufacture of the component to help locate the fibrous material in its intended position and/or orientation (i.e. that the fibrous material extends in the intended direction between the first point and the second point). This may help to reduce errors during manufacturing of the component.

In some examples, the at least one groove is configured to retain the fibrous material in its intended position. In some examples, this may be advantageous during manufacture, for example in order that the fibrous material remains stationary while it is at least partially encased in the thermoplastic. In some examples, this may be advantageous during use of the component, for example to help to ensure that the fibrous material remains oriented along its intended direction (e.g. such that it may transfer forces effectively).

In some examples, the at least one groove is proximal to the perimeter of the component. For example, each bushing may comprise a groove located proximal to a top surface of the component and/or a groove located proximal to a bottom surface of the component.

In some examples, the at least one groove extends in a substantially axial direction (i.e. in a direction that is substantially parallel to the longitudinal axis of the component). In some examples, this may help to ensure that the fibrous material also extends in a substantially axial direction (i.e. in a direction that is substantially parallel to the longitudinal axis of the component). In some examples, the at least one groove extends around at least a portion of a perimeter of the bushing.

The at least one groove may have any suitable and desired shape, e.g. corresponding to the shape of the fibrous material. In some examples, the groove has a cross-section which is square, rectangular, triangular, trapezoid, semi-circular or curved. The at least one groove may provide a space to retain the fibrous material in its intended position.

In some examples, the at least one groove comprises a base and two side walls. In some examples, the base and/or two side walls extend in a substantially axial direction (i.e. in a direction that is substantially parallel to the longitudinal axis of the component).

In some examples, the base and/or two side walls extend around at least a portion of a perimeter of the bushing. In some examples, the base extends between the side walls (e.g. to define the groove), e.g. in a direction perpendicular to the front and/or back faces of the component. In some examples, the side walls extend along at least a portion of a perimeter of the front and/or back faces of the component.

In some examples, the base is substantially perpendicular to the two side walls. In some examples, the base provides a surface for the fibrous material to rest on, while the two side walls help to prevent the fibrous material from moving parallel to the surface of the base (e.g. away from the intended position of the fibrous material).

In some examples, (e.g. each of) the at least one bushing comprises a concave (e.g. outer) surface, wherein the concave surface is located proximal to a distal end of the component.

The distal ends of the component are located at opposite ends of the longitudinal axis facing away from the center of the component. The concave surface of the at least one bushing may be located on the part of the bushing that is closest to the distal end of the component.

In some examples, the space between the concave surface of the bushing and the distal end of the component is at least partially filled with thermoplastic. In some examples, the thermoplastic is arranged to be compressed under the influence of external forces (e.g. from acceleration of the aircraft). This may reduce the strength of the component. In some examples, the concave surface of the bushing is configured to bend into the spaces created when the thermoplastic compresses. This may help to provide strength in these regions, thereby helping to improve the performance of the component under stress.

In some examples, the concave surface comprises a single concave portion (e.g. having one center and radius of curvature). In some examples, the concave surface comprises a plurality of concave portions (e.g. having a plurality of centers of curvature and/or a plurality of radii of curvature).

In some examples, bushing comprises (and the concave surface is formed by) two protrusions on the surface of the bushing, e.g. at either side of the concave surface. These protrusions may extend towards the distal ends of the component. The protrusions may be located proximal to the top and bottom surfaces of the component, e.g. the surfaces along which the fibrous material extends. In some examples, this shape may be advantageous in helping this region of the bushing to bend into the spaces created when the thermoplastic compresses.

In some examples, the fibrous material comprises a plurality of continuous carbon fibers. In some examples, the continuous carbon fibers are thread-like in shape (e.g. at least some of the fibers are long, thin strands). In some examples, substantially all of the plurality of carbon fibers are continuous.

In some examples, the fibrous material comprises more than 1,000 continuous carbon fibers, optionally more than 5,000 continuous carbon fibers, optionally more than 10,000 continuous carbon fibers.

In some examples, the fibrous material comprises a plurality of unidirectional carbon fibers. The unidirectional carbon fibers may extend in substantially the same direction. In some examples, substantially all of the plurality of carbon fibers may be unidirectional.

In some examples, the fibrous material extends in a substantially axial direction between the first point and the second point (i.e. in a direction that is substantially parallel to the longitudinal axis of the component). In some examples, this may be the direction of maximum stress and/or load that is applied to the component. This may be advantageous because the fibrous material may provide reinforcement to the component in the direction of maximum stress and/or load.

In some examples, the fibrous material extends in a substantially axial direction between the first point and the second point proximal to the top and/or the bottom perimeter of the component. This, the fibrous material may extend along (or proximal to) the top and/or bottom surfaces of the component.

In some examples, the fibrous material encircles the first point and the second point. The fibrous material may extend around the first point and the second point such that both the first point and the second point are enclosed by the fibrous material in at least one plane of the component, e.g. a cross-sectional plane substantially perpendicular to the fibrous material, e.g. substantially perpendicular to the direction(s) through the aperture(s) of the bushing(s), e.g. substantially parallel to the front face and/or back face of the component.

The fibrous material may form any shape around the first point and the second point. In some examples, the fibrous material takes the following path: extend between the first point and the second point in a substantially axial direction (e.g. proximal to the top surface of the component); wrap around the (e.g. outer perimeter of the) first point (e.g. at a first distal end of the component); extend between the first point and the second point in a substantially axial direction (e.g. proximal to the bottom surface of the component); wrap around the (e.g. outer perimeter of the) second point (e.g. at a second distal end of the component); and, e.g., extend between the first point and the second point in a substantially axial direction (e.g. proximal to the top surface of the component), e.g. such that the fibrous material forms a closed loop that encircles the first point and the second point.

In some examples, there is a region of overlap of the fibrous material (e.g. proximal to the top or bottom surface of the component). This may help to ensure that there are no breaks in the path of the fibrous material around the first point and the second point. This may help to ensure that the fibrous material retains its strength and is able to transfer load across the component.

In some examples, the component comprises a third point and the fibrous material encircles the third point and at least one of the first point and the second point. In some examples, the fibrous material may be arranged in at least two bands (e.g. at least two substantially continuous loops)—a first band may encircle the first point and the second point and a second band may encircle the third point and at least one of the first point and the second point.

The third point many be situated in any suitable and desired location on the component. In some examples, the third point may be located at an axially opposite end of the component from the first point and/or the second point. In some examples, the third point may be located on a different axis from the longitudinal axis defined by the first point and the second point.

As with the first and second points, an aperture or bushing may be located at the third point. Thus, the features described herein in relation to the first and/or second points may apply to the third point, as appropriate.

In some examples, the thermoplastic at least partially surrounds the fibrous material around the perimeter of the component. When the thermoplastic surrounds the fibrous material around the perimeter of the component, the fibrous material is not open to the environment at the surface of the component. This may be advantageous because it may protect the fibrous material from being worn or frayed by contact with the environment. In some examples, the thermoplastic may be harder than the fibrous material, meaning that it may be more suitable for forming an outer surface of the component.

Any suitable and desired proportion of the fibrous material may be surrounded by the thermoplastic around the perimeter of the component. In some examples, at least 50% of the fibrous material may be surrounded by the thermoplastic around the perimeter of the component, in some examples at least 70%, in some examples at least 90%.

According to another example of the present disclosure, there is provided a method of manufacturing a component for a structure of an aircraft interior, wherein at least a portion of the component extends between a first point and a second point, defining a longitudinal axis of the component; and wherein the method comprises: providing at least one bushing; wherein the at least one bushing is located at the first and/or second point; extending a fibrous material between the first point and the second point; and at least partially encasing the at least one bushing and the fibrous material in a thermoplastic.

It will be appreciated that the features described herein in relation to the component may apply to the method, as appropriate. Similarly, the features described herein in relation to the method may apply to the component, as appropriate.

The fibrous material may be extended between (e.g. wrapped around) the first point and the second point in any suitable and desired way. In some examples, the fibrous material is extended between the first point and the second point by (e.g. manual or robotic) fiber placement. In some examples, the fibrous material is extended between the first point and the second point by additive layer deposition. In some examples, the fibrous material is bonded (e.g. by a resin), e.g. before being at least partially encased by the thermoplastic.

In some examples, it may be advantageous to provide the at least one bushing before providing a fibrous material that extends between the first point and the second point. In some examples, the at least one bushing is used to align the fibrous material (e.g. in a desired location and/or such that the fibrous material extends in a desired direction between the first point and the second point) during placement of the fibrous material.

In some examples, the method comprises holding (e.g. clamping) the at least one bushing in position while the fibrous material is extended between the first point and the second point and, e.g., while the at least one bushing and the fibrous material is at least partially encased in the thermoplastic. This helps to set the position of the at least one bushing in the component.

In some examples, the fibrous material contacts the at least one bushing. In some examples, this may help to ensure that the fibrous material remains in its desired position and/or orientation as the thermoplastic is applied.

In some examples, the method further comprises repeating the step of extending (e.g. wrapping) the fibrous material between the first point and the second point. In some examples, the fibrous material may be extended between (e.g. wrapped around) substantially the same path between the first point and the second point, such that layers of the fibrous material are formed. This may help to improve the strength of the fibrous material. In some examples, the step of extending the fibrous material between the first point and the second point is repeated more than five times, optionally more than 10 times, optionally more than 15 times.

In some examples, the thermoplastic is applied to the component by injection molding. Thus, in some examples, the method further comprises injecting thermoplastic into a mold (e.g. that holds the at least one bushing and/or the fibrous material) to at least partially encase the at least one bushing and the fibrous material.

According another example of the present disclosure, there is provided a seat assembly for an aircraft interior, comprising: a front leg; a back leg; and a strut connected between the front leg and the back leg; wherein the strut comprises a component as described herein.

Any of the features of the component discussed herein may be used in the strut of the seat assembly.

BRIEF DESCRIPTION OF THE DRAWINGS

Certain examples of the present disclosure will now be described with reference to the accompanying drawings in which:

FIG. 8 is a flow diagram of a method in accordance with an example of the present disclosure.

DETAILED DESCRIPTION

Figure 1:
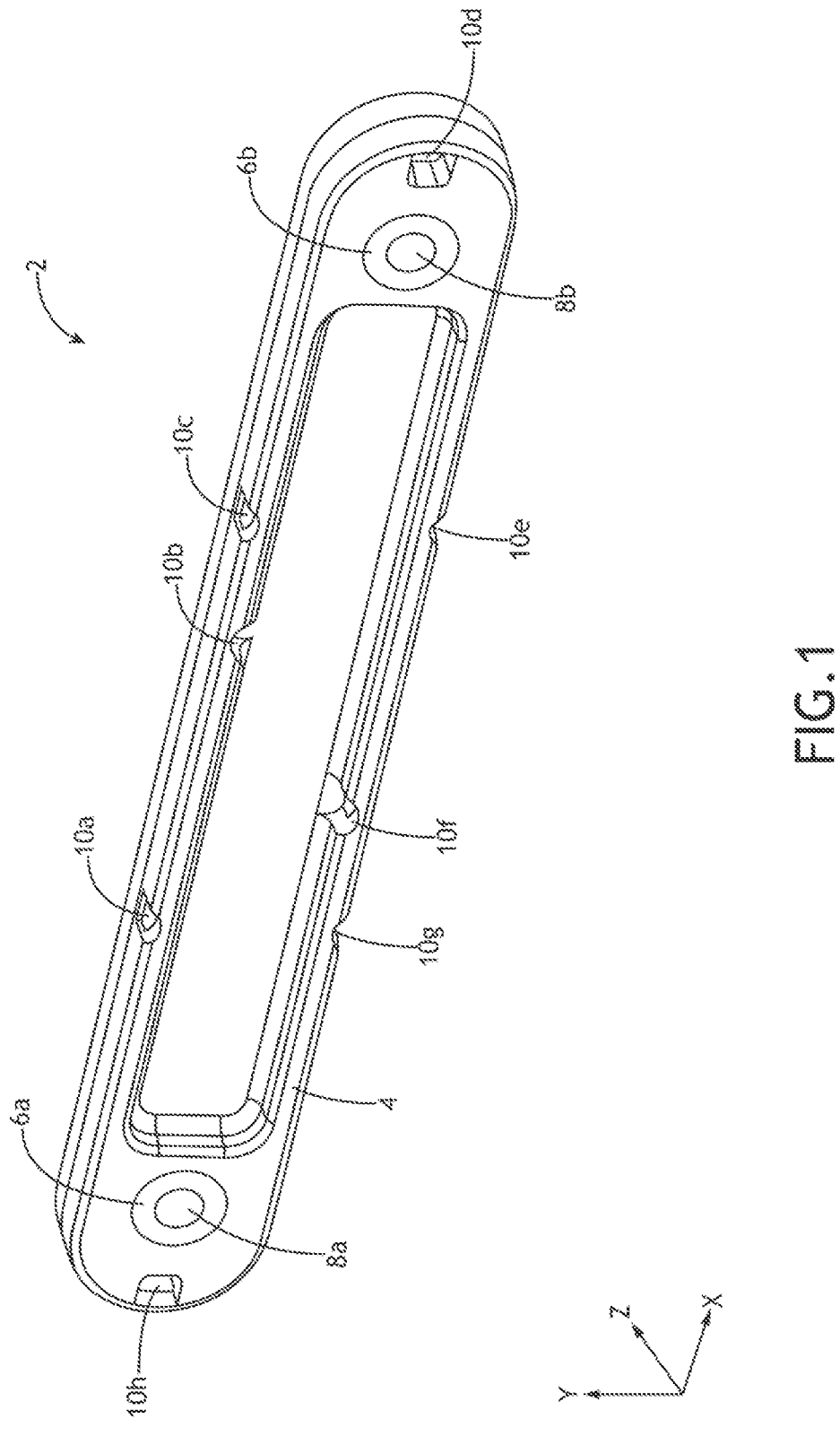
FIG. 1 is a perspective view of a component in accordance with an example of the present disclosure.

FIG. 1 is a perspective view of a component 2 according to an example of the present disclosure. The component 2 comprises a fibrous material (not shown), a thermoplastic 4 and two bushings 6a, 6b located at the first point and the second point respectively.

In this example, the component 2 is a stadium shape in the x-y plane (the x-, y- and z-axes are indicated in FIG. 1). However, it will be understood that the component 2 may have any suitable and desired shape. The various components of the component 2 (e.g. the fibrous material, the thermoplastic 4 and the bushings 6a, 6b) may be arranged in any suitable and desired configuration.

In this example, the bushings 6a, 6b are located at axially opposite ends of the component 2, where the axial direction is indicated by the x-axis. However, it will be understood that the bushings 6 may be arranged in the component 2 in any suitable and desired manner.

In this example, each of the bushings 6a, 6b comprises an aperture 8a, 8b. The apertures 8a, 8b of the bushings 6a, 6b are cylindrical. The longitudinal axes of the (cylindrical) apertures 8a, 8b extend along the z-axis.

In this example, the component 2 includes a number of apertures 10a-h for injection molding of the thermoplastic 4. The thermoplastic 4 may be applied to the bearings 6a, 6b and the fibrous material through the apertures 10*a*-*h*. In this example, the apertures 10*a*-*h* are visible in the finished component.

Figure 2:
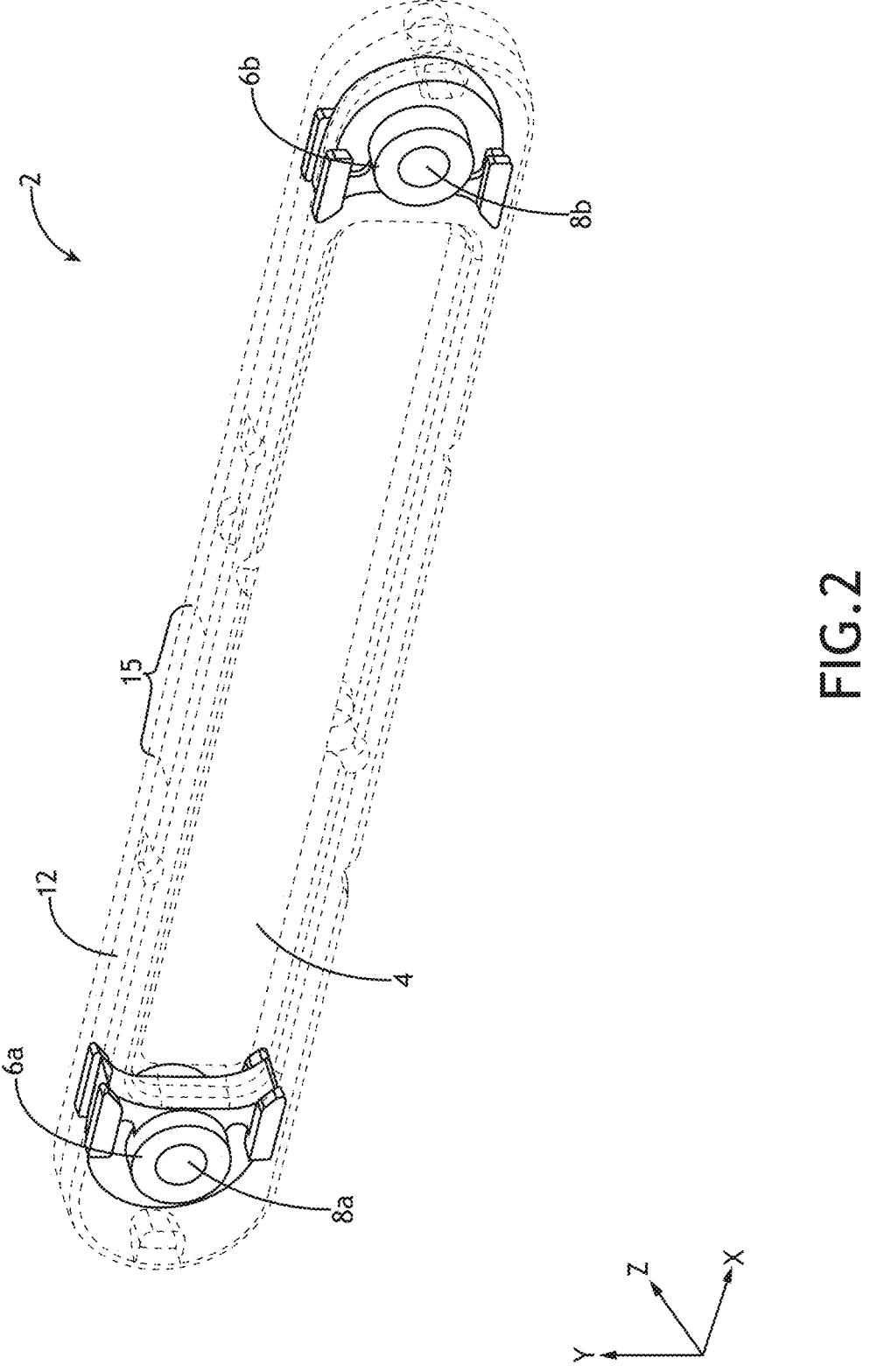
FIG. 2 is a partially transparent, perspective view of a component in accordance with an example of the present disclosure.

FIG. 2 is a partially transparent, perspective view of a component 2 according to an example of the present disclosure. The parts of the component 2 shown in this figure are similar to those shown in FIG. 1.

In this example, the fibrous material 12 can be seen. In this example, the fibrous material 12 encircles the bushings 6*a*, 6*b*. The fibrous material 12 extends along the longitudinal axis (x-axis) proximal to the top surface of the component 2, wraps around the outer perimeter (right hand side) of the bearing 6*b*, extends along the longitudinal axis (x-axis) in the opposite direction proximal to the bottom edge of the component 2, wraps around the outer perimeter (left hand side) of the bearing 6*a* and continues to extend along the longitudinal axis (x-axis) proximal to the top surface of the component 2.

In this example, there is a region of overlap 15 of the fibrous material 12 proximal to the top surface of the component 2. This may help to ensure that there are no spaces in the fibrous material 12 as it encircles the bushings 6*a*, 6*b*. This may help to ensure that the material properties imparted by the fibrous material 12 (e.g. high strength) are substantially uniform around the component 2.

In some examples, the fibrous material 12 may be wrapped around (e.g. as set out above) more than once, in order to build up a plurality of layers of fibrous material 12 in the component 2.

In this example, the fibrous material 12 is a continuous fiber. In this example, the fibrous material 12 includes a plurality of continuous fibers. In some examples, the plurality of continuous fibers may be unidirectional, meaning that they are all oriented in substantially the same direction.

In some examples, the (e.g. unidirectional fibers of the) fibrous material 12 may be aligned with the direction of highest load or stress experienced by the component 2 during use. This may help to ensure that the component 2 is reinforced in the direction of highest load or stress. In this example, the direction of highest load or stress may be along the x-axis.

Figure 3:
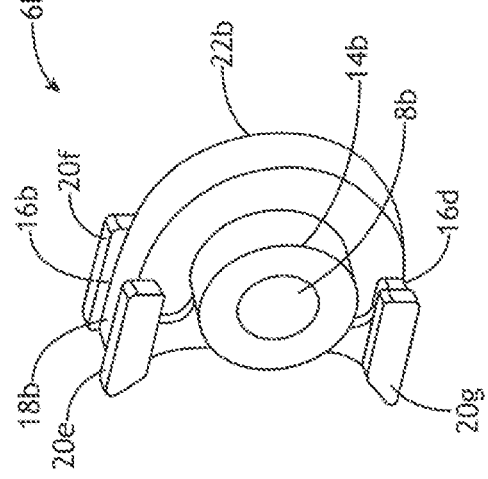
FIG. 3 is a perspective view of a pair of bushings in accordance with an example of the present disclosure.
Figure 3:
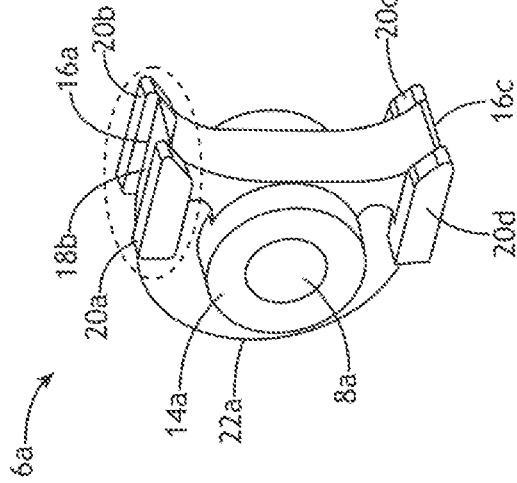
Figure 3:

FIG. 3 is a perspective view of a pair of bushings 6*a*, 6*b* according to an example of the present disclosure.

In this example, the bushings 6*a*, 6*b* each comprise a protruding part 14*a*, 14*b* surrounding the aperture 8*a*, 8*b*. In some examples, the protruding parts 14*a*, 14*b* may form part of the outer surface of the component 2. In some examples, this may help to provide a reinforced entrance to the aperture 8*a*, 8*b* that is more resistant to wear.

In this example, each of the bushings 6*a*, 6*b* comprises grooves 16*a*-*d*. In this example, the grooves 16*a*-*d* are located at the top and bottom surfaces of the bushings 6*a*, 6*b*. The grooves 16*a*-*d* extend along the longitudinal direction (x-axis) of the component 2. The fibrous material 12 may be located at least partially inside the grooves 16*a*-*d* (e.g. as it at least partially wraps around the bushings 6*a*, 6*b*).

The grooves 16*a*-*d* may help to support and retain fibrous material 12 in its intended position, both during manufacture and during use of the component 2. This may also be advantageous in examples where there are a plurality of layers of fibrous material 12, because the grooves 16*a*-*d* may help to ensure that each layer of fibrous material 12 is deposited in the same location.

In this example, the grooves 16*a*-*d* each comprise a flat bottom surface 18*a*, 18*b* (e.g. that is parallel to the x-z plane)

and two side walls 20*a*-*g* (e.g. which are parallel to the x-y plane). In FIG. 3, not all of the flat bottom surfaces 18 and side walls 20 are visible.

In some examples, the side walls may help to prevent movement of the fibrous material 12 (e.g. along the z-axis). However, it will be understood that the grooves 16*a*-*d* may have any suitable and desired geometry. For example, the grooves 16*a*-*d* may have a cross-section (e.g. in the y-z plane) which is square, rectangular, triangular, trapezoid, semi-circular, or curved.

In some examples, the bushings 6*a*, 6*b* may each comprise any number of grooves 16*a*-*d*. The number and location of any grooves 16*a*-*d* on the bushings 6*a*, 6*b* may be dependent upon the desired location of the fibrous material 12 relative to the bushings 6*a*, 6*b*. The grooves 16*a*-*d* may be formed in any suitable and desired way. For example, the grooves 16*a*-*d* may be cut or machined from the bushings 6*a*, 6*b*.

In this example, each of the bushings 6*a*, 6*b* includes a convex surface 22*a*, 22*b*, located proximal to the distal end of the component. However, the bushings 6*a*, 6*b* may have any suitable and desired shape. For example, an alternative design is shown in FIG. 4.

Figure 4:
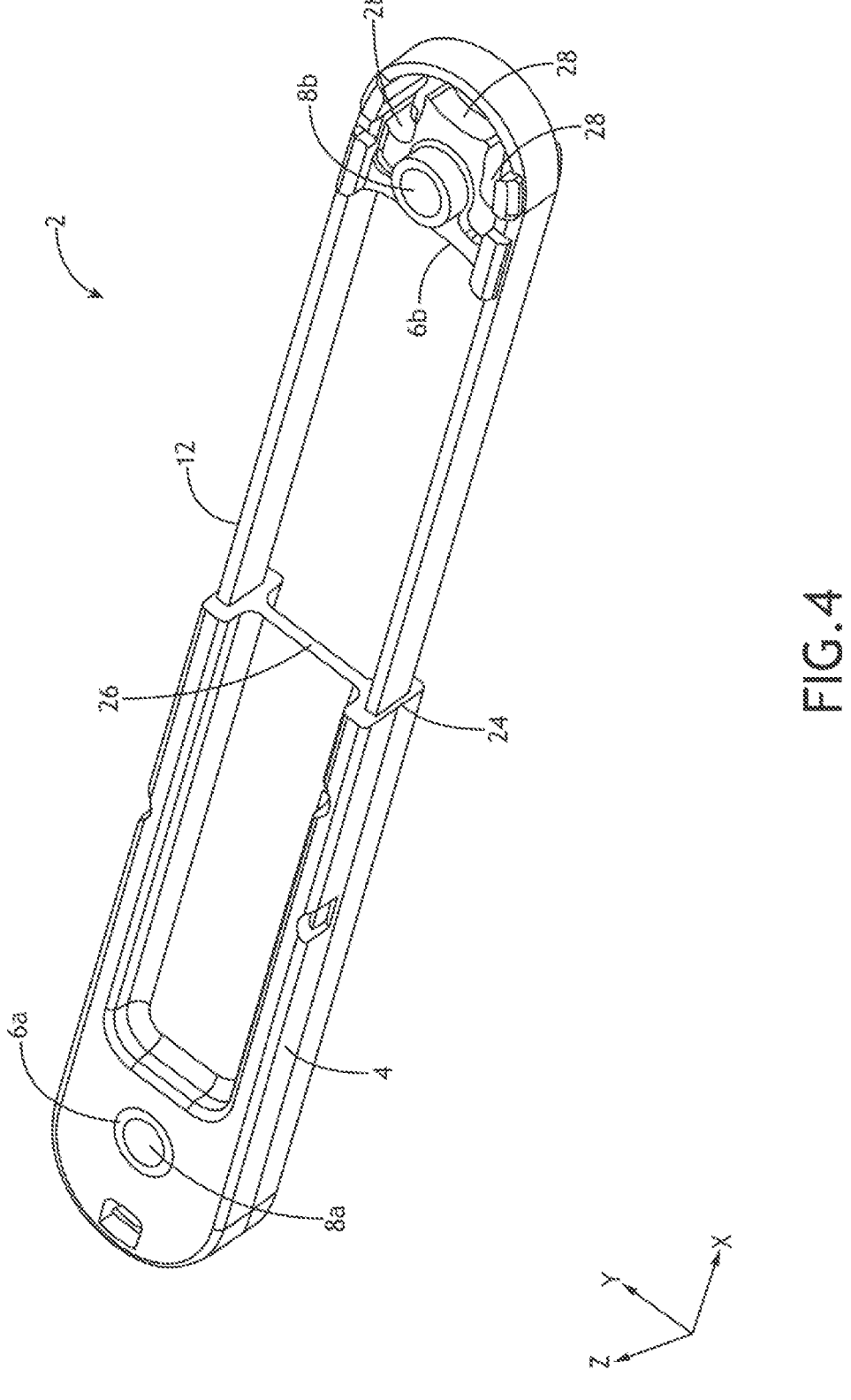
FIG. 4 is a partially cut-away perspective view of a component in accordance with an example of the present disclosure.

FIG. 4 is a partially cut-away, perspective view of a component 2 according to an example of the present disclosure. Although in this example, the thermoplastic 4 covers only half of the component 2, it will be understood that this is not necessarily an intended embodiment of the component 2. Instead, the thermoplastic 4 is illustrated as being cut away so that other (e.g. internal) parts of the component 2 can be more clearly seen.

In this example, it can be seen that the thermoplastic 4 at least partially surrounds the fibrous material 12 at an outer surface of the component 2. For example, the portion 24 of the thermoplastic 4 that is shown surrounds the fibrous material 12 around the perimeter of the component 2. This ensures that the fibrous material 12 is not exposed to the environment at the outer surface of the component 2. This may help to ensure that the component 2 has a harder outer surface (e.g. compared to an example where the fibrous material 12 is exposed to the environment). In some examples, this may help to ensure that the fibrous material 12 does not become damaged (e.g. frayed/worn), thereby helping to ensure that it maintains its strength.

In this example, the thermoplastic 4 substantially surrounds the fibrous material 12 on all of its surfaces (i.e. not just at the outer surface of the component 2). This may help to ensure that the fibrous material 12 remains in its intended position within the component 2. This may also help to ensure that load is transferred effectively between the different materials in the component 2, due at least in part to the increased contact area between the thermoplastic 4, fibrous material 12 and/or the bushings 6*a*, 6*b*.

In this example, it can be seen that the thermoplastic 4 has a thinner central portion, indicated by reference numeral 26. In some examples, it may be advantageous for the thermoplastic 4 to be as thin as possible, in order to reduce the weight of the component 2. Therefore, in the regions of the component 2 where the thermoplastic 4 is not encasing another part (e.g. the fibrous material 12 and/or the bushings 6*a*, 6*b*), the thickness of the thermoplastic 4 is kept to a minimum.

In this example, the bushings 6*a*, 6*b* have a different design from the examples shown in FIGS. 1-3. Instead of the convex surface 22*a*, 22*b* of the bushings 6*a*, 6*b* shown in FIGS. 1-3, in this example the bushings 6*a*, 6*b* include a plurality of concave surfaces 28. The concave surfaces 28 of the bushing 6a cannot be seen in FIG. 4. However, each of the concave surfaces 28 are located proximal to the distal ends of the component 2.

In this example, the concave surface 28 is configured such that there is a space between the bushing 6a, 6b and the fibrous material 12 at the distal ends of the component 2. In some examples, the space between the bushing 6a, 6b and the fibrous material 12 may be substantially filled with thermoplastic 4. Under high levels of stress, the thermoplastic 4 may compress and the concave surface 28 of the bushings 6a, 6b may deform inwardly to occupy any vacant spaces which are produced when the thermoplastic 4 compresses. This may help to improve the response of the distal ends of the component 2 to high levels of stress (e.g. to help to prevent damage or wear to the component 2).

Figures 5A, 5B:
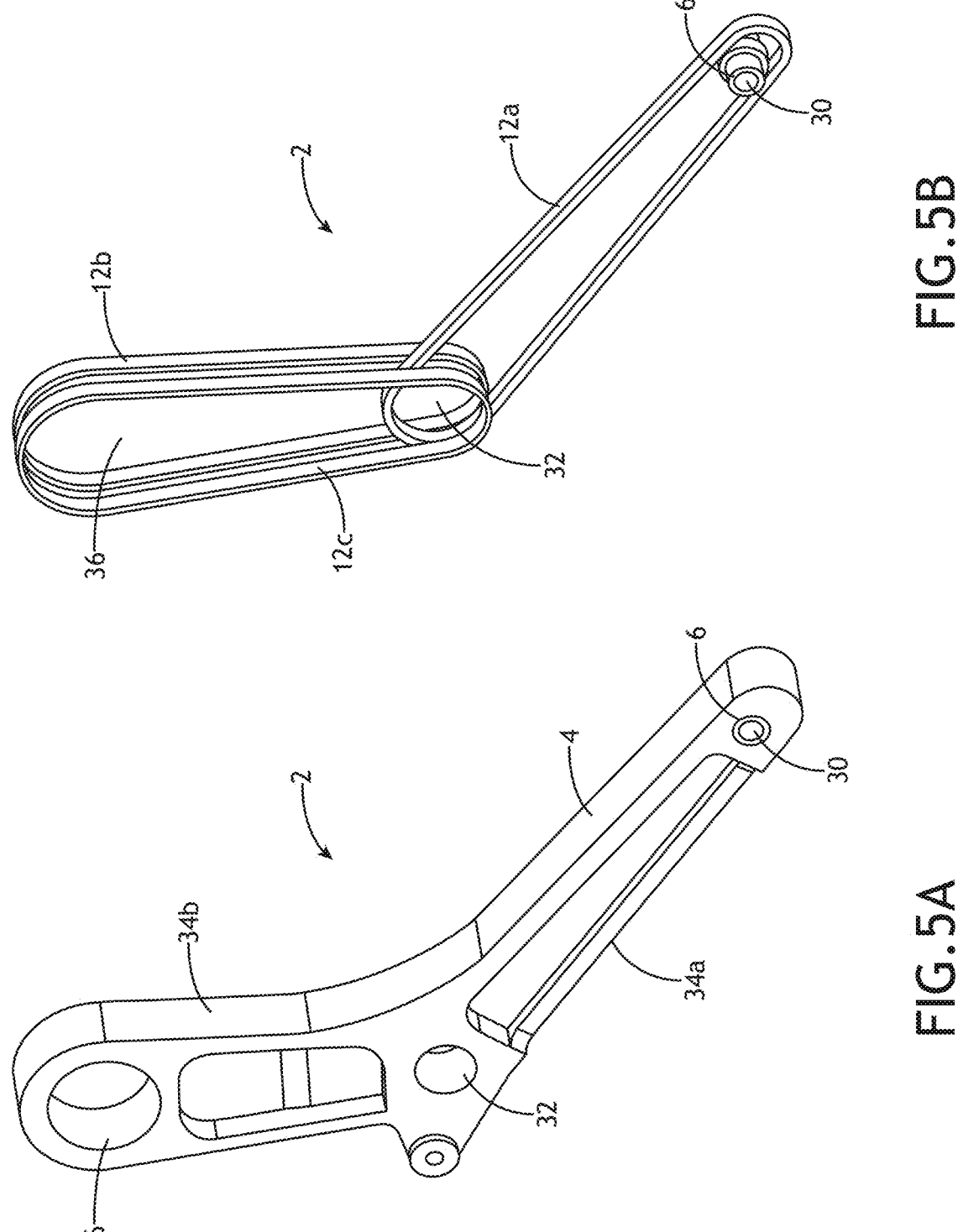
FIG. 5a is a perspective view of a component in accordance with an example of the present disclosure.
FIG. 5b is a partially cut-away perspective view of a component in accordance with an example of the present disclosure.

FIG. 5a is a perspective view of a component 2 according to an example of the present disclosure. In this example, the component 2 includes a bushing 6 located at the first point 30. A longitudinal axis of the component 2 extends between the first point 30 and the second point 32.

In this example, there is an aperture without a bushing located at the second point 32. There is a further aperture located at a third point 36 of the component. In some examples, an aperture may help to reduce the weight of the component 2 (by reducing the volume of thermoplastic 4 in the component 2). In some examples, an aperture may be configured to form a connection point to another object (e.g. when the component 2 is used as part of a larger structure). An aperture may be formed in the component in any suitable and desired way. For example, the aperture may be a feature of a mound used to form the shape of the thermoplastic 4.

In this example, the component 2 includes a first arm 34a and a second arm 34b. In this example, the arms 34a, 34b each extend outwardly in the same plane from the second point 32. The third point 36 is located on the second arm 34b of the component 2.

FIG. 5b is a partially cut-away perspective view of a component 2 according to an example of the present disclosure. FIG. 5b shows the component of FIG. 5a without any thermoplastic 4. Although in this example, the component 2 does not include any thermoplastic 4, it will be understood that this is not necessarily an intended embodiment of the component 2. Instead, the thermoplastic 4 is illustrated as being cut away so that other (e.g. internal) parts of the component 2 can be more clearly seen.

In this example, it can be seen that the component 2 includes three separate bands of fibrous material 12a-c. In this example, the fibrous material 12a-c is completely encased in thermoplastic 4, meaning that substantially no fibrous material 12a-c is visible on the exterior surface of the component 2 when the thermoplastic 4 is present (as can be seen in FIG. 5a).

In this example, one band of fibrous material 12a extends along the first arm 34a of the component 2, and two bands of fibrous material 12b, 12c extend along the second arm 34b of the component 2.

A band of fibrous material 12a extends between and encircles the first point 30 (including the bushing 6) and the second point 32. This band of fibrous material 12a may help to provide strength to the component along the longitudinal axis of the component 2 (i.e. in a direction extending between the first point 30 and the second point 32).

In this example, the band of fibrous material 12a is in contact with an outer surface of the bushing 6. In this example, the band of fibrous material 12a extends substantially tangentially from opposing points on the outer surface of the bushing.

In this example, the component 2 includes two further bands of fibrous material 12b, 12c. In this example, the bands of fibrous material 12b, 12c extend between and encircles the second point 32 and the third point 36. In this example, the bands of fibrous material 12b, 12c do not encircle the first point 30. In this example, both of the bands of fibrous material 12b, 12c have the same extent, which partially overlaps with the extent of the band of fibrous material 12a.

In some examples, fibrous material 12a-c may be placed in the component 2 in any location that may experience high stress. In this example, the directions of highest stress are along the first arm 34a and along the second arm 34b.

Figure 6:
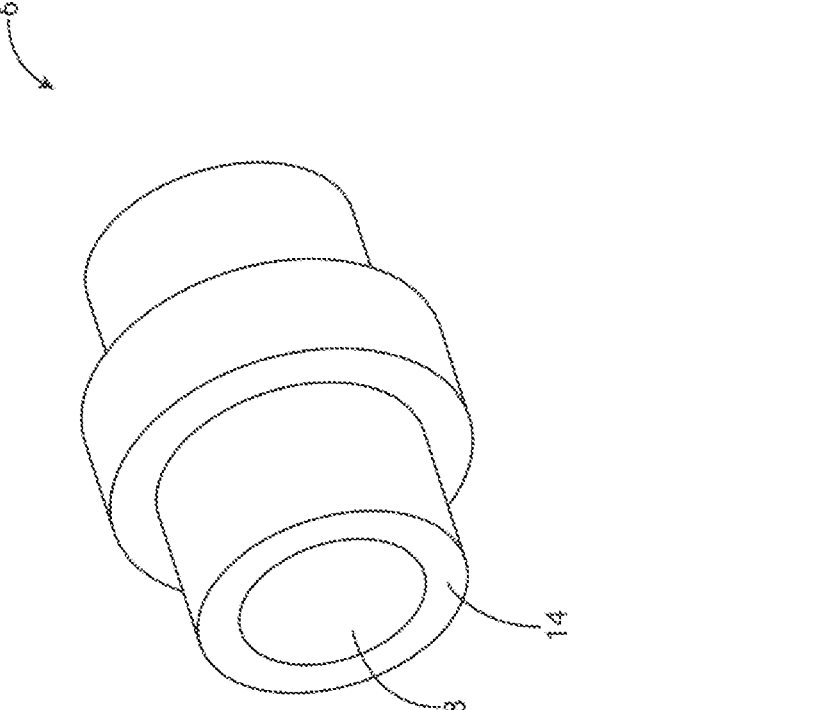
FIG. 6 is a perspective view of a bushing in accordance with an example of the present disclosure.

FIG. 6 is a perspective view of a bushing 6 in accordance with an example of the present disclosure. In this example, the bushing 6 includes an aperture 8 and a protruding part 14. In some examples, the protruding part 14 may form part of the outer surface of the component 2.

In this example, the bushing 6 does not include a groove 16 or a concave surface 28. However, the bushing 6 may be used in any component 2 according to any examples of the present disclosure.

Figure 7:
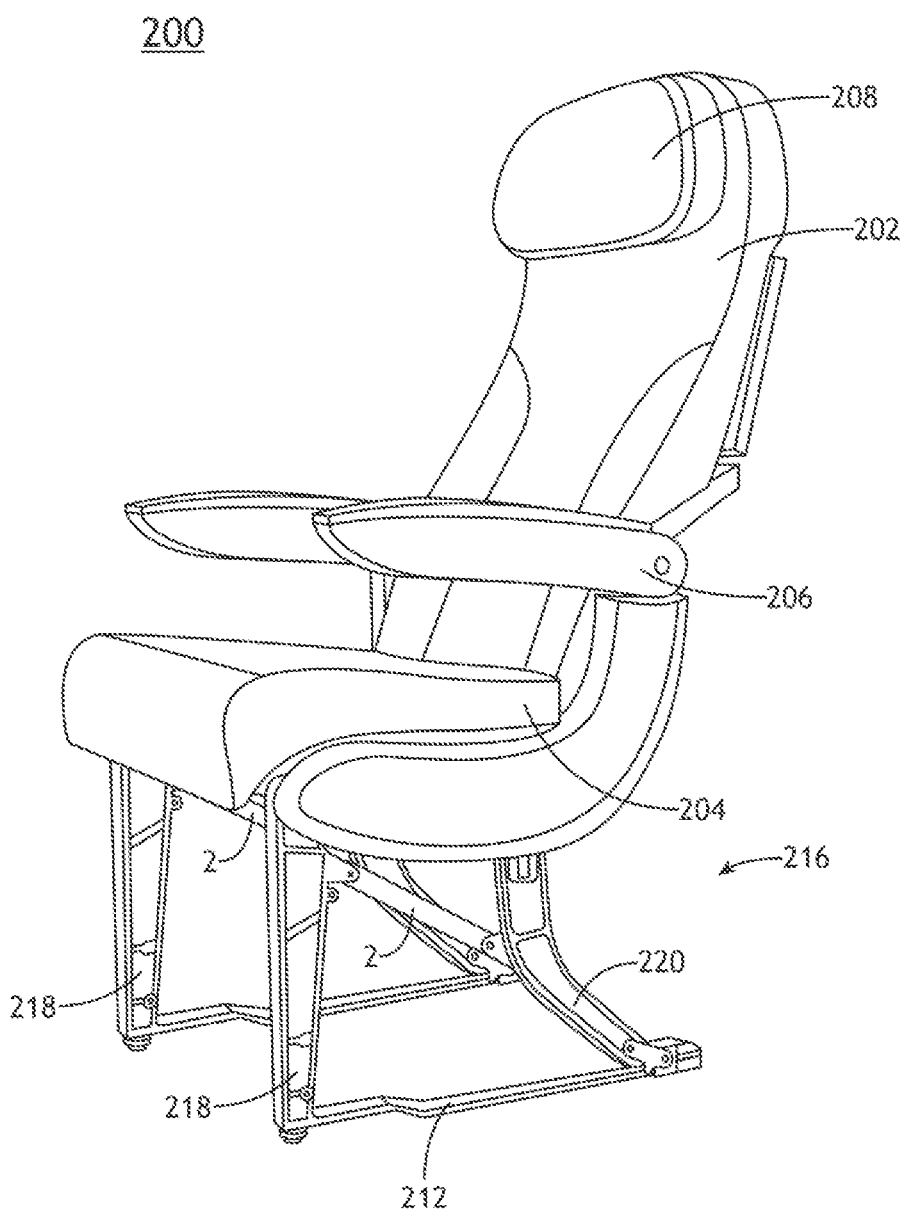
FIG. 7 is a perspective view of a component in accordance with an example of the present disclosure.

FIG. 7 is a perspective view of a component 2 according to an example of the present disclosure. In this example, the component 2 is used in the seat 200 of an aircraft.

In this example, the seat 200 includes a base part 204, a pair of armrests 206, a back 202 and a headrest 208. The seat 200 further includes a leg assembly 216. In this example, the leg assembly 216 includes a pair of front legs 218, a pair of back legs 220, and a pair of connecting parts 212, which are configured to connect the seat 200 to the floor of the aircraft cabin.

In this example, the seat 200 further includes a pair of components 2 according to an example of the present disclosure. In this example, the pair of components 2 are configured to connect each of the front legs 218 to one of the back legs 220.

In this example, the bushings 6a, 6b may be used to connect the components 2 to the front legs 218 and the back legs 220 of the seat 200. In some examples, it may be advantageous for the bushings 6a, 6b to be formed of a material of higher stiffness than the thermoplastic 4. Using a higher stiffness material at the connection points may help to prevent wear or creep over time, as the higher stiffness material may be more resilient to high stress.

In some examples, the components 2 may help to distribute load between the front legs 218 and the back legs 220. In some examples, the components 2 may be subject to stress and strain along the longitudinal axis of the component 2 (e.g. as load is distributed along the component 2). In some examples, the fibrous material 12 may be substantially aligned with the direction of highest stress of the component 2. This may help to improve the ability of the component 2 to transfer load without damage to the component 2.

FIG. 8 is a flow chart showing a method of manufacturing a component for a structure of an aircraft interior according to an example of the present disclosure, wherein at least a portion of the component extends between a first point and a second point, defining a longitudinal axis of the component. The method comprises the steps of: providing at least one bushing, wherein the at least one bushing is located at the first and/or second point (step 101); extending a fibrous material between the first point and the second point (step 102); and at least partially encasing the at least one bushing and the fibrous material in a thermoplastic (step 103). In some examples, the method further comprises repeating the step of extending the fibrous material between the first point and the second point (step 104).

What is claimed:

1. A component for a structure of an aircraft interior, the component comprising:

at least one bushing, wherein at least a portion of the component extends between a first point and a second point, defining a longitudinal axis of the component, wherein the at least one bushing is located at one or more of the first point or the second point, wherein the component is elongated along its longitudinal axis, wherein the at least one bushing comprises an aperture, wherein the aperture extends in a direction perpendicular to the longitudinal axis of the component, wherein the at least one bushing comprises at least one groove located on at least one of a top surface or a bottom surface of the at least one bushing;

a fibrous material that extends between the first point and the second point, wherein a portion of the fibrous material is situated inside the at least one groove; and a thermoplastic that at least partially encases the at least one bushing and the fibrous material, wherein the at least one bushing is formed of a different material to the thermoplastic, wherein the at least one bushing has a higher stiffness than a stiffness of the thermoplastic.

2. The component of claim 1, wherein the first point and the second point are located proximal to axially opposite ends of the component.

3. The component of claim 1, wherein the at least one bushing comprises a concave surface;

wherein the concave surface is located proximal to a distal end of the component.

4. The component of claim 1, wherein the fibrous material extends in a axial direction between the first point and the second point.

5. The component of claim 1, wherein the fibrous material encircles the first point and the second point.

6. The component of claim 1, wherein the component comprises a third point;

the fibrous material encircles the third point and at least one of the first point and the second point.

7. The component of claim 1, wherein the thermoplastic at least partially surrounds the fibrous material around a perimeter of the component.

8. A seat assembly for an aircraft interior, comprising:

a front leg;

a back leg; and a strut connected between the front leg and the back leg;

wherein the strut comprises a component, the component comprising:

at least one bushing, wherein at least a portion of the component extends between a first point and a second point, defining a longitudinal axis of the component, wherein the at least one bushing is located at one or more of the first point or the second point, wherein the component is elongated along its longitudinal axis, wherein the at least one bushing comprises an aperture, wherein the aperture extends in a direction perpendicular to the longitudinal axis of the component, wherein the at least one bushing comprises at least one groove located on at least one of a top surface or a bottom surface of the at least one bushing;

a fibrous material that extends between the first point and the second point, wherein a portion of the fibrous material is situated inside the at least one groove; and a thermoplastic that at least partially encases the at least one bushing and the fibrous material, wherein the at least one bushing is formed of a different material to the thermoplastic, wherein the at least one bushing has a higher stiffness than a stiffness of the thermoplastic.

* * * * *